(12) United States Patent
Tucker et al.

(10) Patent No.: US 10,479,166 B2
(45) Date of Patent: Nov. 19, 2019

(54) TOGGLE BUTTON

(71) Applicants: DENSO International America, Inc., Southfield, MI (US); DENSO CORPORATION, Kariya, Aichi-pref. (JP)

(72) Inventors: Javon Tucker, Southfield, MI (US); Christopher Levay, Grand Rapids, MI (US)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/858,597

(22) Filed: Dec. 29, 2017

(65) Prior Publication Data
US 2019/0202257 A1    Jul. 4, 2019

(51) Int. Cl.
*H01H 21/12* (2006.01)
*B60H 1/00* (2006.01)
*H01H 21/22* (2006.01)

(52) U.S. Cl.
CPC .......... *B60H 1/0065* (2013.01); *H01H 21/12* (2013.01); *H01H 21/22* (2013.01); *B60Y 2306/09* (2013.01)

(58) Field of Classification Search
CPC ................. H01H 13/14; H01H 13/023; H01H 2221/016; H01H 2221/044; H01H 13/83; H01H 2221/058; H01H 23/30; H01H 25/041; H01H 13/52; H01H 13/705; H01H 23/145; H01H 13/20
USPC ........ 200/6 A, 5 A, 314, 341–345, 339, 316, 200/17 R, 16 D, 4, 6 R
See application file for complete search history.

(56) References Cited

U.S. PATENT DOCUMENTS

| 4,492,830 | A | * | 1/1985 | Kim .................... G05G 9/04796 |
| | | | | 200/5 R |
| 5,068,498 | A | * | 11/1991 | Engel ..................... H01H 25/04 |
| | | | | 200/6 A |
| 2011/0303516 | A1 | | 12/2011 | Beyginian et al. |
| 2016/0293358 | A1 | | 10/2016 | Kawachi |

* cited by examiner

*Primary Examiner* — Ahmed M Saeed
(74) *Attorney, Agent, or Firm* — Harness, Dickey & Pierce, P.L.C.

(57) ABSTRACT

A toggle button assembly for a human-machine interface (HMI). The toggle button assembly includes a circuit board. A first switch and a second switch are mounted to the circuit board. A toggle body is rotatable about a toggle body rotation axis. A first switch actuator is between the toggle body and the first switch, and a second switch actuator is between the toggle body and the second switch. Upon actuation of the toggle body from a center position to a first position, the toggle body rotates about the toggle body rotation axis and presses the first switch actuator against the first switch to actuate the first switch. Upon actuation of the toggle body from the center position to a second position, the toggle body rotates about the toggle body rotation axis and presses the second switch actuator against the second switch to actuate the second switch.

16 Claims, 3 Drawing Sheets

TOGGLE BUTTON

FIELD

The present disclosure relates to a toggle button for a human-machine interface (HMI).

BACKGROUND

This section provides background information related to the present disclosure, which is not necessarily prior art.

Human-machine interfaces (HMI) often include toggle buttons, which can be actuated by a user to enter commands into the HMI. For example and with respect to an HMI for a vehicle heating, ventilation, and air conditioning (HVAC) system, a user may actuate a toggle button upward to increase the desired temperature setting, or downward to decrease the desired temperature setting. While current toggle buttons are suitable for their intended use, they are subject to improvement. For example, a new toggle button that exhibits the following advantages would be desirable: low cost structure; reliable activation; desirable haptic feeling; stable equilibrium position (thereby preventing or reducing buzz, squeak, rattle (BSR) noises when the vehicle is under vibration); and a packaging footprint that is smaller as compared to current toggle buttons, particularly in the toggling direction (such as the H-direction of FIG. 6, for example only). The present disclosure includes toggle buttons that provide these advantages, as well as numerous other advantages and unexpected results as one skilled in the art will appreciate.

SUMMARY

This section provides a general summary of the disclosure, and is not a comprehensive disclosure of its full scope or all of its features.

The present disclosure provides for a toggle button assembly for a human-machine interface (HMI). The toggle button assembly includes a circuit board. A first switch and a second switch are mounted to the circuit board. A toggle body is rotatable about a toggle body rotation axis. A first switch actuator is between the toggle body and the first switch, and is rotatable about a first switch actuator rotation axis. A second switch actuator is between the toggle body and the second switch, and is rotatable about a second switch actuator rotation axis. Upon actuation of the toggle body from a center position to a first position, the toggle body rotates about the toggle body rotation axis and presses the first switch actuator against the first switch to actuate the first switch. Upon actuation of the toggle body from the center position to a second position, the toggle body rotates about the toggle body rotation axis and presses the second switch actuator against the second switch to actuate the second switch.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Figure 1:
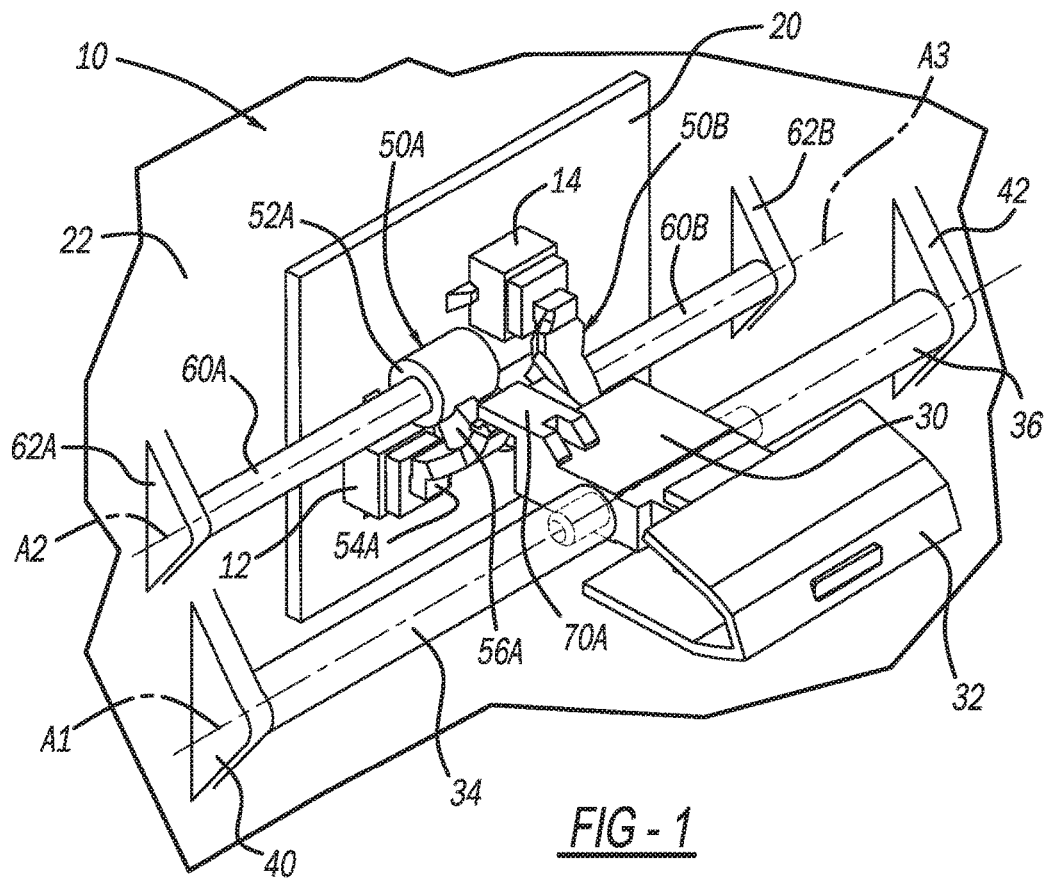
FIG. 1 is a perspective view of a toggle button assembly in accordance with the present disclosure.

Example embodiments will now be described more fully with reference to the accompanying drawings.

FIGS. 1-6 illustrate an exemplary toggle button assembly 10 in accordance with the present teachings. The toggle button assembly 10 can be included with any suitable human machine interface (HMI) for controlling any suitable system. For example, the toggle button assembly 10 can be included with an HMI of a vehicle heating, ventilation, and air conditioning (HVAC) system to enter inputs to the HMI to control any suitable features of the HVAC system. For example, the toggle button assembly 10 can be configured such that actuation thereof increases or decreases a desired temperature setting.

The toggle button assembly 10 includes a first switch 12 and a second switch 14. The first and second switches 12 and 14 can be any suitable switches, such as tact switches, or can include rubber elastomer domes with carbon pills. The first switch 12 and the second switch 14 can each be biased in an outward position so as to maintain the toggle button assembly 10 in the center or neutral (at rest) position illustrated throughout the figures when the toggle button assembly 10 has not been actuated by a user, as described in detail herein. The first switch 12 and the second switch 14 are mounted to a circuit board 20. The circuit board 20 is in communication with any suitable controller of the HMI so as to send inputs to the controller indicating when the first switch 12 and the second switch 14 has been actuated. The circuit board 20 is mounted to any suitable base 22, such as a front case of an HVAC control panel.

The toggle button assembly 10 further includes a toggle body 30, which has a toggle cap 32 at a distal end thereof. From the center or neutral (at rest) position illustrated throughout the figures, the toggle body 30 can be actuated to a first position (such as upward) or a second position (such as downward). Once the toggle body 30 has been released by a user after being actuated to either the first position or the second position, the toggle body 30 automatically returns to the center position illustrated throughout the figures, as explained further herein.

The toggle body 30 is mounted to the base 22 by a first toggle body rotation member 34 and a second toggle body rotation member 36, which are arranged on opposite sides of the toggle body 30. The rotation members 34 and 36 can be any suitable members for rotatably mounting the toggle body 30, such as pins, shafts, etc. The rotation members 34 and 36 are described herein as shafts for exemplary purposes only. The first toggle body rotation shaft 34 extends from the toggle body 30 to a base mount 40 of the base 22. The second toggle body rotation shaft 36 extends from the toggle body 30 to a base mount 42 of the base 22. The toggle body 30, when actuated, rotates about a toggle body rotation axis A1, which extends along an axial center of the first toggle body rotation shaft 34 and the second toggle body rotation shaft 36.

Mounted between the toggle body 30 and the first switch 12 is a first switch actuator (or rocker) 50A. Mounted between the toggle body 30 and the second switch 14 is a second switch actuator (or rocker) 50B. The first switch actuator 50A includes a first switch actuator mount 52A, which is mounted to the base 22 by way of a first switch actuator rotation shaft 60A and a mount 62A. The first switch actuator rotation shaft 60A can be a single shaft on a single side of the first switch actuator 50A, or a dual shaft at both sides of the first switch actuator 50A. The first switch actuator 50A is mounted so as to rotate about a first switch actuator rotation axis A2, which extends along an axial center of the first switch actuator rotation shaft 60A. A support 56A extends from the first switch actuator mount 52A. A first actuator arm 54A is at an end of the support 56A opposite to the first switch actuator mount 52A. The first actuator arm 54A can be curved as illustrated, or straight.

The second switch actuator 50B is similar to the first switch actuator 50A, and thus the description of the first switch actuator 50A is also sufficient to describe the second switch actuator 50B. Features of the second switch actuator 50B that are similar to, or the same as, the features of the first switch actuator 50A are designated in the drawings using the same reference numerals, but with the suffix "B" instead of "A." The second switch actuator 50B includes a second switch actuator mount 52B, which is mounted to the base 22 by way of a second switch actuator rotation shaft 60B and a mount 62B. The second switch actuator rotation shaft 60B can be a single shaft on a single side of the first switch actuator 50B, or a dual shaft at both sides of the first switch actuator 50B. The second switch actuator 50B is mounted so as to rotate about a second switch actuator rotation axis A3, which extends along an axial center of the second switch actuator rotation shaft 60B. A support 56B extends from the second switch actuator mount 52B. A second actuator arm 54B is at an end of the support 56B opposite to the second switch actuator mount 52B (see FIG. 5, for example). The second actuator arm 54B can be curved as illustrated, or straight.

The second switch actuator rotation axis A3 is vertically offset (in the H-direction of FIG. 6) from the first switch actuator rotation axis A2 in the example illustrated. However, the first and second switch actuator rotation axes A2 and A3 can be arranged collinear in other applications. The first and second switch actuator rotation axes A2 and A3 are laterally offset (in the Z-direction of FIG. 5) from the toggle body rotation axis A1. The toggle body rotation axis A1, the first switch actuator rotation axis A2, and the second switch actuator rotation axis A3 extend parallel to one another.

Exemplary operation of the toggle body 30 to actuate the first and second switches 12 and 14 will now be described. When a user pushes the toggle cap 32 upward, such as to raise the desired HVAC temperature setting for example, the toggle body 30 rotates about the toggle body rotation axis A1 in a counterclockwise direction with respect to the views of FIGS. 1 and 2. A first tab 70A extending from the toggle body 30 contacts the first actuator arm 54A and pushes the first actuator arm 54A against the first switch 12 to depresses (or pushes inward) the first switch 12. As the first tab 70A presses down onto the first actuator arm 54A, the first switch actuator 50A rotates about the first switch actuator rotation axis A2.

Figure 2:
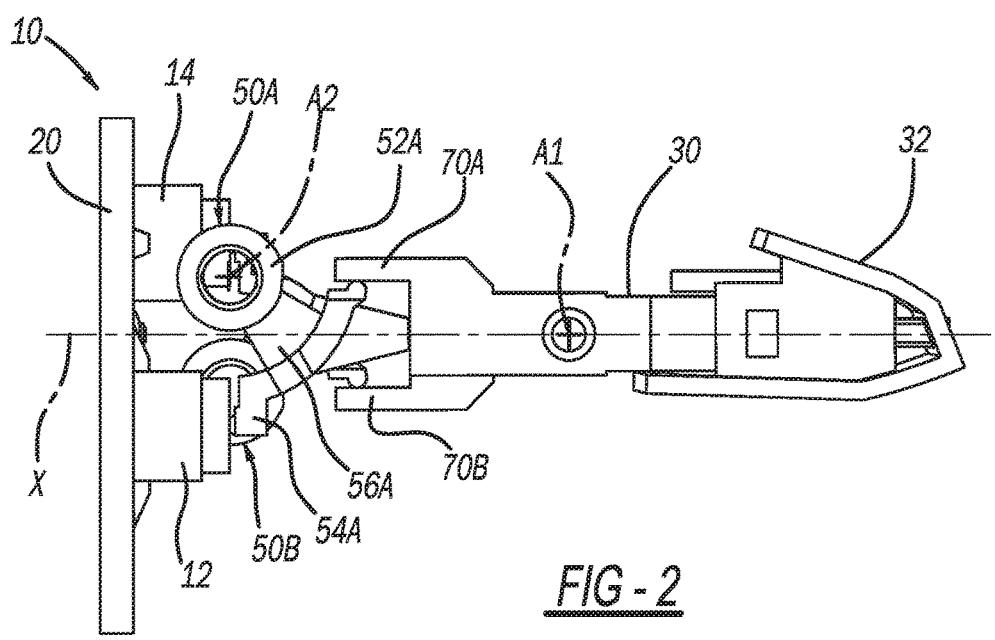
FIG. 2 is a side view of the toggle button assembly of FIG. 1.
Figure 3:
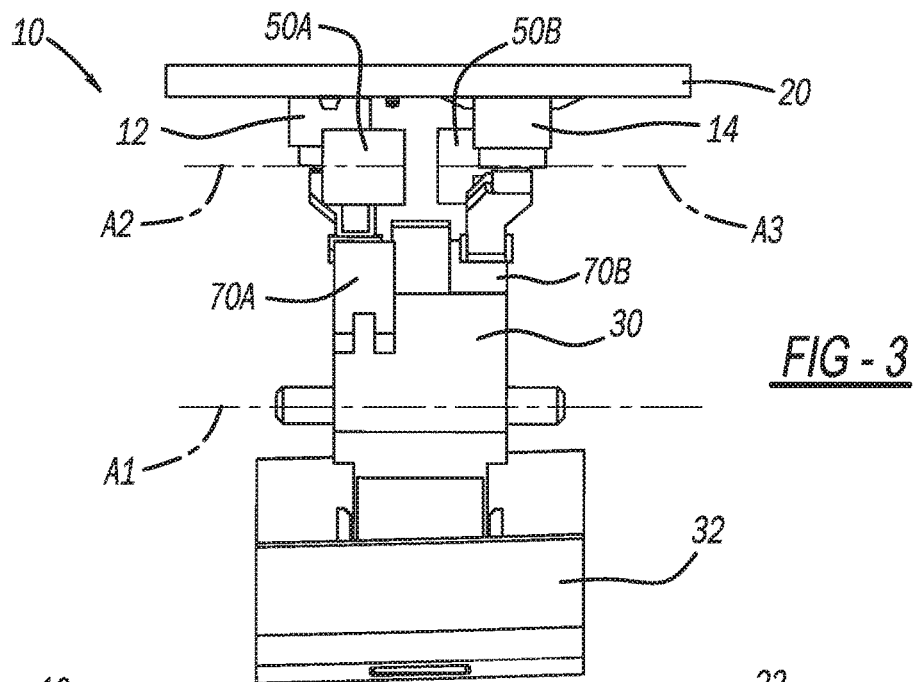
FIG. 3 is a top view of the toggle button assembly of FIG. 1.
Figure 4:
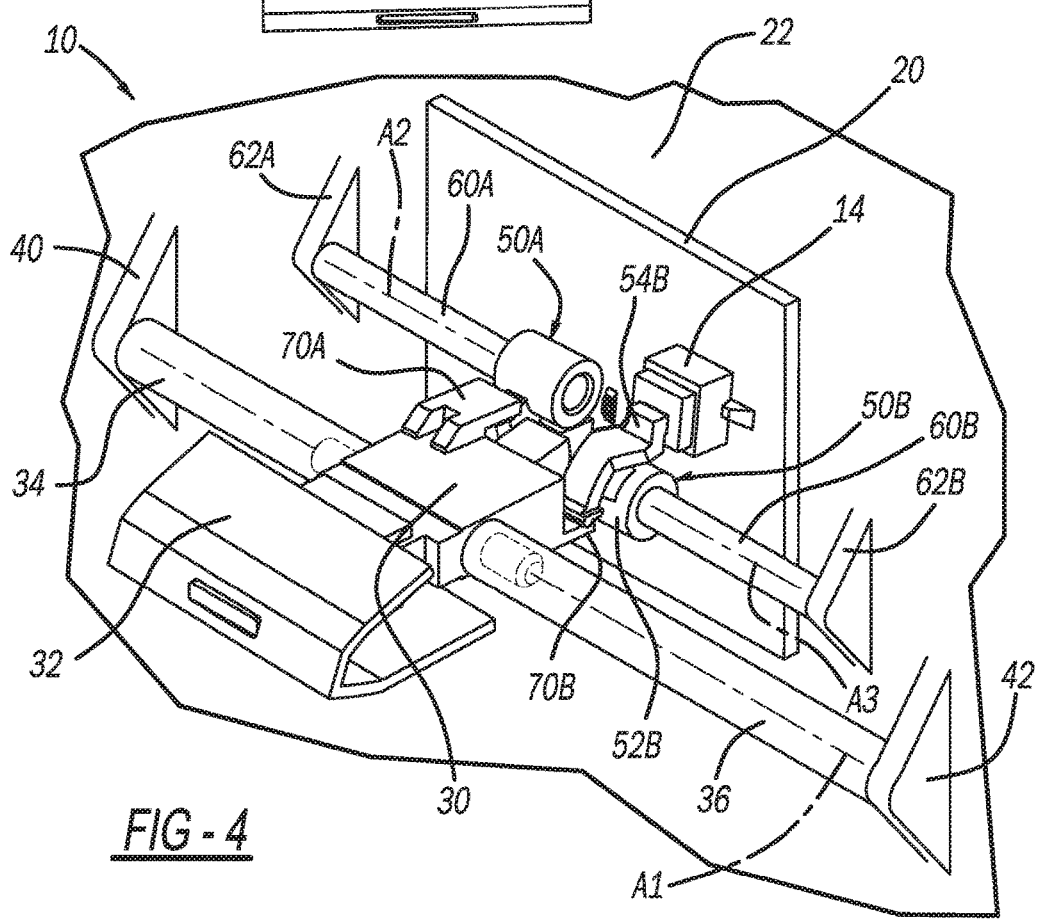
FIG. 4 is another perspective view of the toggle button assembly of FIG. 1.
Figure 5:
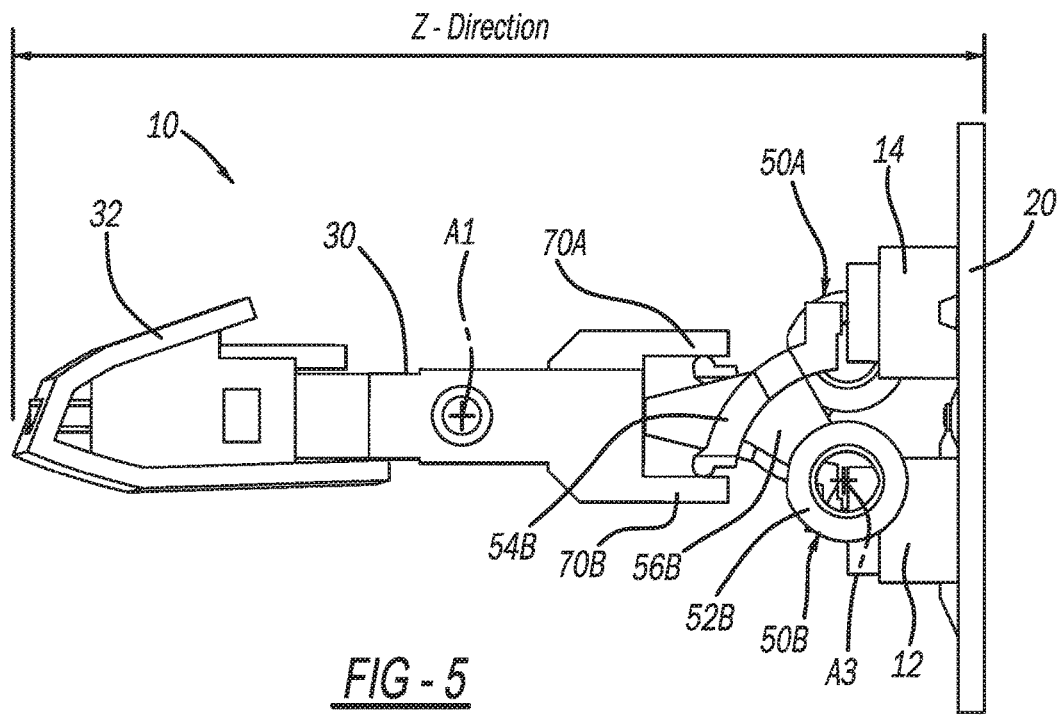
FIG. 5 is another side view of the toggle button assembly of FIG. 1.
Figure 6:
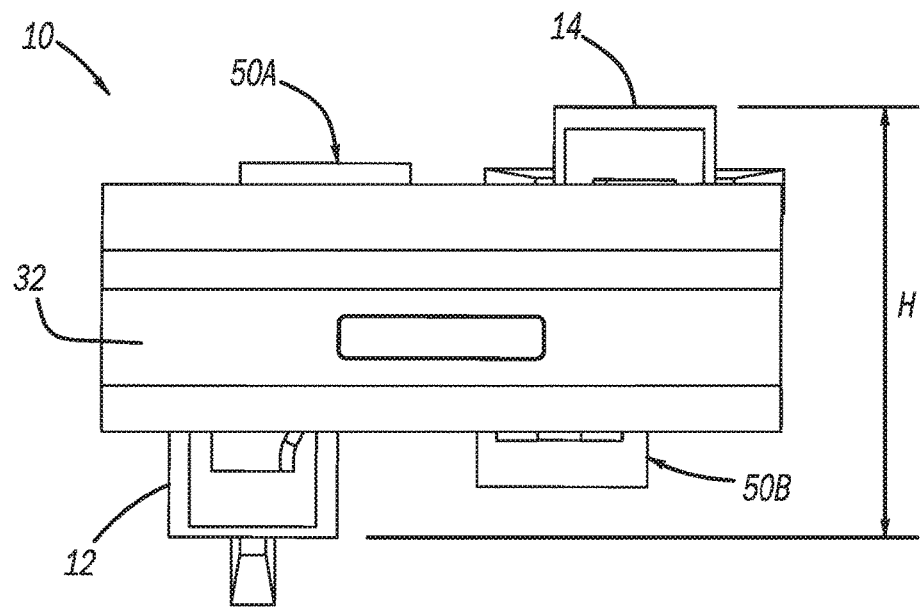
FIG. 6 is a front view of the toggle button assembly of FIG. 1.

When the user releases the toggle cap 32, the toggle body 30 will no longer exert inertial/actuating force against the first switch 12. Thus the first switch 12 will be free to return to its unpressed/resting position, which results in the first switch 12 exerting force upon the first actuator arm 54A to move the first actuator arm 54A in a counterclockwise direction (as illustrated in FIGS. 1 and 2) against the first tab 70A. The first actuator arm 54A will rotate the toggle body 30 in a clockwise direction (as illustrated in FIGS. 1 and 2) until the toggle body 30 returns to the center or neutral position illustrated throughout the figures. With particular reference to FIG. 2, in the center position the toggle body 30 is arranged such that a longitudinal axis X thereof extends generally perpendicular to the circuit board 20, and through a portion of the circuit board 20 between the first switch 12 and the second switch 14.

When the user presses downward on the toggle cap 32 to move the toggle body 30 from the center (neutral) position to the second (downward) position (to lower the desired HVAC temperature setting, for example), a second tab 70B of the toggle body 30 will move against the second actuator arm 54B, and press the second actuator arm 54B against the second switch 14 in order to actuate the second switch 14. Actuation of the second switch 14 results in transmission of a signal from the circuit board 20 to a controller indicating that the toggle body 30 has been pressed downward by a user requesting, for example, a reduction in the desired temperature setting of the HVAC system. When the user releases the toggle cap 32, the second tab 70B no longer exerts actuating force on the second actuator arm 54B, and thus the second actuator arm 54B will no longer exert pressure on the second switch 14. This will allow the second switch 14 to move back to the unpressed/resting position in which the second switch 14 is biased. As the second switch 14 moves back to its unpressed/resting position, the second switch 14 moves the second actuator arm 54B against the second tab 70B to rotate the toggle body 30 back to the center or neutral position illustrated throughout the figures.

The toggle button assembly 10 provides numeral advantages. For example, the toggle button assembly 10 provides for a reliable HMI input device with a reduced cost, reliable activation, desirable haptic feeling, stable equilibrium position (which reduces or prevents buzz, squeak, and rattle noises when the vehicle is under vibration), and a packaging footprint that is smaller as compared to current toggle buttons. For example and with reference to FIG. 6, the toggle button assembly 10 has a height H measured from a bottom of the first switch 12 to a top of the second switch 14 that is less than current toggle buttons. This advantageously reduces the amount of valuable space that the toggle button assembly occupies on a vehicle, such as at a center stack of the vehicle. An additional advantage of the toggle button assembly 10 of the present disclosure is that only a single circuit board 20 is necessary. This is in contrast to current toggle buttons, which often require more than one PCB. Thus by including only a single circuit board 20, the present disclosure provides for a toggle button assembly 10 that can be provided at a reduced cost as compared to current toggle buttons.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A toggle button assembly for a human-machine interface (HMI), the toggle button assembly comprising:
   a circuit board;
   a first switch mounted to the circuit board;
   a second switch mounted to the circuit board;
   a toggle body rotatable about a toggle body rotation axis;
   a first switch actuator between the toggle body and the first switch, the first switch actuator including a first switch actuator mount and a first switch actuator arm;
   a first switch actuator rotation shaft extends from the first switch actuator mount, the first switch actuator rotation shaft rotates about a first switch actuator rotation axis;
   a second switch actuator between the toggle body and the second switch, the second switch actuator including a second switch actuator mount and a second switch actuator arm; and
   a second switch actuator rotation shaft extends from the second switch actuator mount, the second switch actuator rotation shaft rotates about a second switch actuator rotation axis;
   wherein upon actuation of the toggle body from a center position to a first position, the toggle body rotates about the toggle body rotation axis and presses the first switch actuator against the first switch to actuate the first switch;
   wherein actuation of the toggle body from the center position to the first position presses a first tab extending from the toggle body against the first switch actuator arm, which presses against the first switch to actuate the first switch;
   wherein upon actuation of the toggle body from the center position to a second position, the toggle body rotates about the toggle body rotation axis and presses the second switch actuator against the second switch to actuate the second switch;
   wherein actuation of the toggle body from the center position to the second position presses a second tab extending from the toggle body against the second switch actuator arm, which presses against the second switch to actuate the second switch; and
   wherein the toggle body rotation axis, the first switch actuator rotation axis, and the second switch actuator rotation axis all extend in parallel to one another.

2. The toggle button assembly of claim 1, wherein the first switch and the second switch are mounted to the circuit board vertically offset from one another.

3. The toggle button assembly of claim 1, wherein the first switch and the second switch are both tact switches, or both include rubber elastomer domes with carbon pills.

4. The toggle button assembly of claim 1, wherein the first switch and the second switch are preloaded in an outward position to bias the toggle body in the center position, return the toggle body from the first position to the center position, and return the toggle body from the second position to the center position.

5. The toggle button assembly of claim 1, wherein the toggle button assembly includes only a single circuit board.

6. The toggle button assembly of claim 1, wherein the toggle body is connected to a first toggle body rotation shaft and a second toggle body rotation shaft, each one of the first and second toggle body rotation shafts extends along the toggle body rotation axis.

7. The toggle button assembly of claim 6, further comprising a base to which the circuit board is mounted, each one of the first toggle body rotation shaft, the second toggle body rotation shaft, the first switch actuator shaft, and the second switch actuator shaft is mounted to the base.

8. A toggle button assembly for a human-machine interface (HMI), the toggle button assembly comprising:
   a first switch depressible from an outward position to an inward position, the first switch biased in the outward position;
   a second switch depressible from an outward position to an inward position, the second switch biased in the outward position;
   a circuit board to which the first switch and the second switch are mounted;
   a toggle body rotatable about a toggle body rotation axis;
   a first switch actuator between the toggle body and the first switch, the first switch actuator including a first switch actuator mount and a first switch actuator arm;
   a first switch actuator rotation shaft extends from the first switch actuator mount, the first switch actuator rotation shaft rotates about a first switch actuator rotation axis
   a second switch actuator between the toggle body and the second switch, the second switch actuator including a second switch actuator mount and a second switch actuator arm;
   a second switch actuator rotation shaft extends from the second switch actuator mount, the second switch actuator rotation shaft rotates about a second switch actuator rotation axis;
   wherein actuation of the toggle body from a neutral position to a first position presses the first switch actuator against the first switch to move the first switch from the outward position to the inward position;
   wherein actuation of the toggle body from the neutral position to the first position presses a first tab extending from the toggle body against the first actuator arm, which presses against the first switch to actuate the first switch;
   wherein actuation of the toggle body from the neutral position to a second position presses the second switch actuator against the second switch to move the second switch from the outward position to the inward position;
   wherein actuation of the toggle body from the neutral position to the second position presses a second tab extending from the toggle body against the second actuator arm, which presses against the second switch to actuate the second switch; and
   wherein the toggle body rotation axis, the first switch actuator rotation axis, and the second switch actuator rotation axis all extend in parallel to one another.

9. The toggle button assembly of claim 8, wherein the toggle body is biased to return to the neutral position from the first position and from the second position.

10. The toggle button assembly of claim 8, wherein a longitudinal axis of the toggle body extends perpendicular to the toggle body rotation axis.

11. The toggle button assembly of claim 8, wherein the first switch actuator rotation axis and the second switch actuator rotation axis are vertically offset from one another.

12. The toggle button assembly of claim 8, wherein the first switch and the second switch are mounted to the circuit board vertically offset from one another.

13. The toggle button assembly of 8, wherein the first switch and the second switch are both tact switches, or both include rubber elastomer domes with carbon pills.

14. The toggle button assembly of claim 8, wherein the toggle button assembly includes only a single circuit board.

15. The toggle button assembly of claim 8, wherein:
   upon release of the toggle body after the toggle body has been actuated to the first position, the first switch moves to the outward position, which presses the first switch actuator against the toggle body to move the toggle body back to the neutral position; and
   upon release of the toggle body after the toggle body has been actuated to the second position, the second switch moves to the outward position, which presses the second switch actuator against the toggle body to move the toggle body back to the neutral position.

16. The toggle button assembly of claim 8, further comprising a base;
   wherein the circuit board, the toggle body, the first switch actuator, and the second switch actuator are each mounted to the base.

* * * * *

UNITED STATES PATENT AND TRADEMARK OFFICE
CERTIFICATE OF CORRECTION

PATENT NO. : 10,479,166 B2
APPLICATION NO. : 15/858597
DATED : November 19, 2019
INVENTOR(S) : Javon Tucker et al.

Page 1 of 1

It is certified that error appears in the above-identified patent and that said Letters Patent is hereby corrected as shown below:

In the Claims

Column 7, Line 25: In Claim 8, after "axis", insert --;--

Column 8, Line 24: In Claim 13, after "of", insert --claim--

Signed and Sealed this
Twenty-fifth Day of February, 2020

Andrei Iancu
*Director of the United States Patent and Trademark Office*